Inventor
Rudolf Gottschald

Arthur Schwartz
Attorney

United States Patent Office 3,445,131
Patented May 20, 1969

3,445,131
BALL JOINTS, IN PARTICULAR FOR GUIDES AND STEERING GEAR, PREFERABLY OF MOTOR VEHICLES
Rudolf Gottschald, Osterath am Meerbusch, Germany, assignor to A. Ehrenreich & Cie, Dusseldorf-Oberkassel, Germany
Filed Oct. 18, 1966, Ser. No. 587,548
Claims priority, application Germany, Oct. 30, 1965, E 30,394
Int. Cl. F16c *11/06;* B25g *3/38*
U.S. Cl. 287—90                                                     2 Claims

ABSTRACT OF THE DISCLOSURE

A ball and socket joint having a substantially spherical bottom portion surrounding the joint pin and a liner between the housing and the bottom portion, both members being formed of artificial coal.

Background and objects

Figure 1:
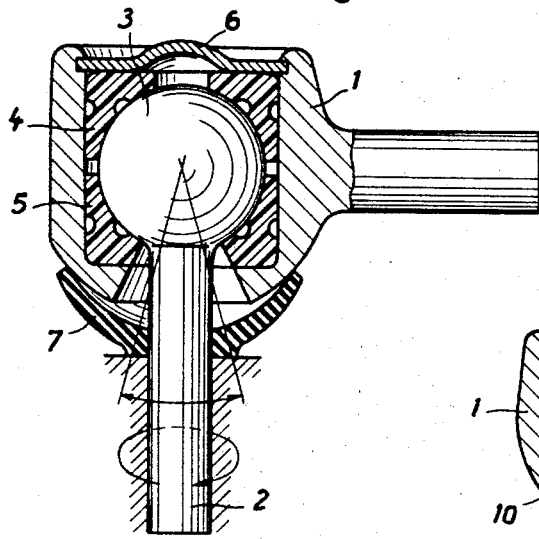

The present invention relates to a ball joint intended in particular for guides and steering gear, preferably of motor vehicles and comprising a joint case or housing and a joint pin with a ball head which is supported in the joint case as to be universally movable while at least one of the bearing surfaces being movable relative to each other is made from a non metal material. Essentially, guides will include wheel suspensions, guide bearings, struts and spherical gear fastenings in motor vehicle production.

It is already known to effect pairing of the bearing surfaces of ball joints which are movable relative to each other such that one of the bearing surfaces is made from steel while the other one is made from plastics or that both bearing surfaces consist of plastics. Plastics include materials of polyamide and superpolyamide or polyurethane basis with interlaced structure which has been proposed in this case. Good practical experiences have been obtained especially with the last mentioned ball joints.

The primary object of the present invention is to provide a ball joint with a comparatively high bearing and load capacity as well as with a good wearing quality, comparatively inexpensive and even suitable for non-maintenance operation.

Surprisingly this problem has been solved according to the present invention in finding that a joint of the said type will be obtained when at least one of the bearing surfaces which are movable relative to each other, consists of so-called artificial coal. Coal of this type is, for instance, used in the manufacture of electrodes in which the artificial coal is called electrode graphite.

Artificial coal is a material which is produced from carbon powder. The carbon is, for instance, carbon in the form of natural substances such as ground coal, graphite or of artificial substances originating from other processes such as coke, soot, retort carbon, mixed with binding agents such as tar, etc. and, for instance, burnt and, if necessary, subsequently graphited. Electrode graphite has appeared to be especially suitable as artificial coal.

The bearing surface may be made either from full material or by forming without cutting.

The artificial coal may also contain friction reducing or even friction increasing additions.

If both bearing surfaces will consist of artificial coal, it will be possible that the bearing surfaces show different properties.

The especially favorable effect of pairing, for instance, an artificial coal bearing surface and a steel surface, is explained by the fact that the circumferential grooves resulting, for instance, from processing or other unevennesses in the steel bearing surface such as the grooves in a transversal direction to the joint pin axis, will have been filled after a number of angular deflections of the joint pin or movements of the joint so that perfectly smooth surfaces will be obtained which fit together, lie on top of each other with an extremely low frictional resistance. This results in the fact that the joint has an easy run which is scarcely surpassed and that it will be effective immediately and without resistance. These features are of special advantage if the springs are intended to respond immediately, and with an effect on damping elements no additional delay due to response of the same is to occur. A further specially favorable feature of the ball joint according to the present invention is that the artificial coal has rather good heat transfer qualities with respect to steel so that heat elimination from the joint is very favorable and interior heating of the joint is not liable to occur in contrast to ball joints with plastic bearing surfaces. With the joint according to the invention interior heat occurring is rapidly transferred towards the outside and gradually increasing interior heating of the joint cannot occur. Even the silencing effect resulting from the present invention is to be regarded as an essentially favorable feature of the joint.

The present invention permits that the steel surface which is one of the bearing surfaces, remains in the condition as it results from processing to form a bearing surface, i.e. after forming of the bearing surface subsequent treatment of the steel bearing surface such as hardening, chromium plating or similar will not be required. This is an essential contribution towards a less expensive price of the joint.

If so desired, lubrication grooves may be provided in the plastic bearing surface.

Summary

In an example of a preferred construction of the ball joint which is provided with a ball head in the form of a spherical segment or a spherical cap through which the joint pin will be inserted and one shoulder of which is supported on the flat surface of the cap, or in which the spherical segment or the cap is slipped on a pin on the flat surface of a joint pin which is provided with a spherical segment, the spherical segment or the spherical cap respectively are made from artificial coal according to the present invention.

The ball joint may also be provided with a lubricant supply or be provided with a possibility for lubrication as it results from the packing of the joint at the passage opening where the joint pin leaves the joint case at which location provision of a lubricant is generally required. In spite of all expectations it has been found that lubrication is not detrimental although when using artificial coal for packing purposes lubrication is not deemed to be favorable.

The drawing shows various embodiments according to the present invention.

Figure 2:
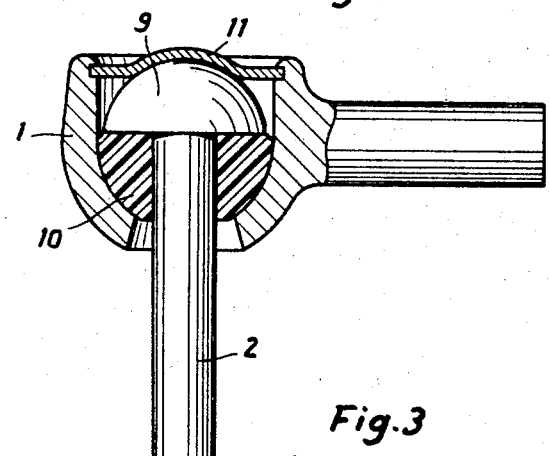
Figure 4:
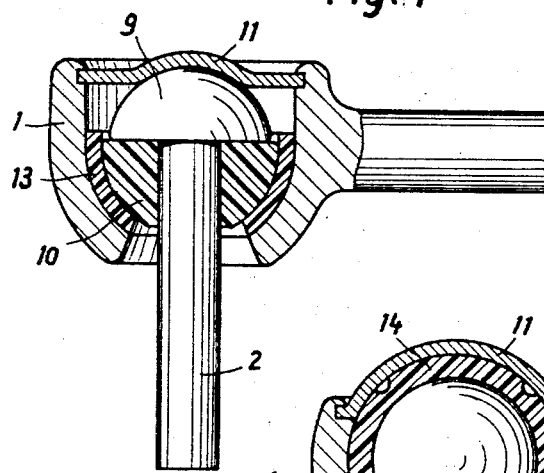
Figure 3:
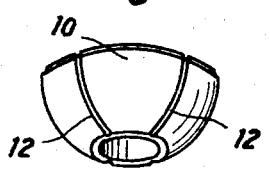
Figure 5:
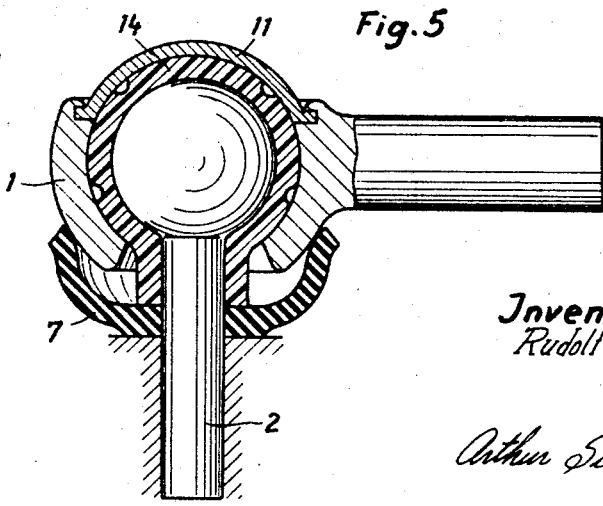

FIG. 1 is a vertical section of a ball joint.
FIG. 2 is a vertical section of another embodiment of a ball joint.
FIG. 3 is a view of the spherical cap only of the joint as shown in FIG. 2.
FIG. 4 is a vertical section of a ball joint in which both bearing surfaces are made from artificial coal.
FIG. 5 is a vertical section of a ball joint in which the ball head is provided with a plastic coat.

In the embodiment according to FIG. 1 the joint case 1 is made from steel. The joint pin has been identified as 2 and has a ball head 3. The joint pin with the ball head is also made from steel.

The ball head is supported in the joint case between the two ball sockets 4 and 5. The ball sockets are made from artificial coal.

The case cover has been identified as 6. 7 is a packing consisting of an elastic material and located at the passage opening where the joint pin leaves the joint case.

In the ball joint as shown in FIG. 2 the case 1 also consists of steel. The joint pin 2 has a head 9 with a spherical surface. The lower side of the head is a shoulder. The joint pin 2 has been pushed through a spherical cap 10 on which it is supported by means of said shoulder. The spherical cap 10 is made from artificial coal. The case 1 has been covered by a cover 11 which has been rolled into the case. The head has a hollow ball surface corresponding to the spherical shape of the head of the joint pin.

As may be seen from FIG. 3, the spherical cap 10 may be provided at its exterior surface with lubrication grooves 12.

The joint as shown in FIG. 4 corresponds to the joint which is shown in FIG. 2. However, it is provided with a hollow ball bearing bush 13 consisting of artificial coal. In this case the hollow ball bearing bush 13 may have properties different from those of the spherical cap 10.

FIG. 5 shows a ball joint in which the ball head 1 of the joint pin has been provided with an artificial coal coat 14.

It will be possible to omit the grooves shown in FIGS. 1 and 5 which have been provided in the artificial coal bearing bodies.

The artificial coal to be used for the ball joints does not contain any metal added.

I claim:
1. A ball and socket joint comprising:
 (a) a housing,
 (b) a joint pin having one end extending from an opening in one end of said housing and having an enlarged head positioned on the other end, said head being positioned within said housing,
 (c) said head having at least a substantially spherical top portion,
 (d) an annular substantially spherical bottom portion surrounding said pin within said housing and abutting said head,
 (e) a hollow bearing liner positioned between said bottom portion and said housing,
 (f) said bottom portion and said hollow bearing liner both being formed of artificial coal,
 (g) a closure plate closing the other end of the housing and providing a biasing force against said enlarged head so as to maintain said bottom portion and said liner in engagement.

2. A ball and socket joint as defined in claim 1 wherein said artificial coal is substantially free of any metal.

References Cited

UNITED STATES PATENTS

| | | | |
|---|---|---|---|
| 1,300,501 | 4/1919 | Sorel | 308—238 |
| 2,115,087 | 4/1938 | Schaefer | 287—90 |
| 2,461,866 | 2/1949 | Alldredge | 287—90 |
| 2,627,443 | 2/1953 | Becker | 308—238 XR |
| 2,701,151 | 2/1955 | Booth | 287—90 |
| 2,901,300 | 8/1959 | Burr | 308—238 |
| 2,912,267 | 11/1959 | Latzen | 287—90 |
| 3,025,090 | 3/1962 | Langen | 287—87 |
| 3,149,863 | 9/1964 | Melton et al. | 287—90 |

FOREIGN PATENTS 1,299,403  6/1962  France.

CARL W. TOMLIN, *Primary Examiner.*

A. V. KUNDRAT, *Assistant Examiner.*

U.S. Cl. X.R.

308—238